United States Patent

Durand et al.

[11] Patent Number: 5,965,481
[45] Date of Patent: Oct. 12, 1999

[54] PROCESS FOR PREPARING A CATALYST SUITABLE FOR THE TREATMENT OF EXHAUST GASES FROM INTERNAL COMBUSTION ENGINES

[75] Inventors: Daniel Durand, Rueil Malmaison; Gil Mabilon, Carrieres S/Seine; Isabelle Guibard, Rueil Malmaison, all of France

[73] Assignee: Institut Francais du Petrole, Rueil-Malmaison, France

[21] Appl. No.: 08/291,565

[22] Filed: Aug. 16, 1994

Related U.S. Application Data

[63] Continuation-in-part of application No. 08/243,490, May 16, 1994, abandoned.

[30] Foreign Application Priority Data

May 14, 1993 [FR] France .................................. 93/05947

[51] Int. Cl.$^6$ ............................ B01J 23/00; B01J 23/40; B01J 23/58; B01J 23/70
[52] U.S. Cl. ........................ 502/304; 502/306; 502/308; 502/309; 502/314; 502/316; 502/317; 502/319; 502/320; 502/322; 502/323; 502/327; 502/328; 502/330; 502/333; 502/335; 502/336; 502/338
[58] Field of Search .................................... 502/304, 306, 502/308, 309, 314, 316, 317, 319, 320, 322, 323, 327, 328, 330, 333, 335, 336, 338; 423/213.5

[56] References Cited

U.S. PATENT DOCUMENTS

| | | | |
|---|---|---|---|
| 4,378,307 | 3/1983 | Brunelle et al. | 502/232 |
| 4,910,180 | 3/1990 | Berndt et al. | 502/304 |
| 4,916,105 | 4/1990 | Rieck et al. | |
| 5,024,985 | 6/1991 | Koberstein et al. | |
| 5,057,483 | 10/1991 | Wan | 423/213.5 |
| 5,139,992 | 8/1992 | Tauster et al. | 502/304 |

*Primary Examiner*—Walter D. Griffin
*Attorney, Agent, or Firm*—Millen, White, Zelano and Branigan, P.C.

[57] ABSTRACT

The invention involves the production of a catalyst that contains (1) at least one refractory inorganic oxide support, (2) at least one iron oxide, and (3) at least one cerium oxide, (4) at least one metal A, for example, from Groups VIB, VIIB, VIII, and IB of the Periodic System and, optionally (5) at least one compound of metal B, for example, from Groups IA, IIA, the rare-earths group, and Group IVB of the Periodic System, deposited in the form of a porous layer ("washcoat") on a ceramic or metal substrate:

(a) atomizing an aqueous suspension of at least one powder of the refractory inorganic oxide, cerium salt, iron salt, and optionally salt of the metal B; and/or A (b) resuspending the resultant powder and adding any remainder or all of the compound of metal B, as well as, optionally at least one bonding agent and, optionally at least one mineral acid or organic acid;

(c) coating a ceramic or metal substrate is coated with the suspension obtained in step (b);

(d) calcining the resultant coated substrate;

(e) impregnating the resultant coated and calcined substrate with any remainder or all of the precursor of metal A; and (f) thermally activating said coated, calcined, and impregnated substrate coming from step (e).

28 Claims, No Drawings

PROCESS FOR PREPARING A CATALYST SUITABLE FOR THE TREATMENT OF EXHAUST GASES FROM INTERNAL COMBUSTION ENGINES

CROSS-REFERENCE TO RELATED APPLICATION

This application is a continuation-in-part of application Ser. No. 08/243,490, filed May 16, 1994, now abandoned.

BACKGROUND OF THE INVENTION

This invention has as an object a process for producing automotive post-combustion catalysts on metal or ceramic substrates or other refractory inorganic materials. It also has as its object the catalysts obtained by this process.

These catalysts can be used, for example, in the treatment of exhaust gases from internal combustion engines with controlled or non-controlled ignition, operating with a liquid fuel, a liquified petroleum gas (LPG), or a compressed natural gas (CNG).

For monolithic substrates having a beehive (or honeycomb) structure or obtained by stacking of metal strips or else produced by the interlocking of fibers, either metal or ceramic, to be able to receive a well-dispersed, catalytically active phase (generally precious metals) (the catalytic activity generally being proportional to the exposed metal surface area), it is important that the specific surface area of such substrates (which is almost the same as the geometric surface area and is equal to several m² per liter of substrate) be substantially increased. Covering the surface of the substrate with a refractory inorganic oxide having a large surface area (100–200 m$^2$/g) is one way to accomplish this.

Other criteria also have to be met in order for the catalyst to perform well: actually, to keep the performance of the catalyst from being excessively diminished by rapid and intermittent changes in operating conditions, or to impart a certain stability to the catalyst (thermal stability of the substrate and/or of the catalytic phase, reduced sensitivity to potential poisons), it is desirable to add to this inorganic oxide of large surface area compounds that are able to attenuate the extent of these detrimental effects.

It is well known that cerium and iron oxides (particularly U.S. Pat. No. 4,378,307 and U.S. Pat. No. 4,294,726) or other oxides such as those of rare earths or of alkaline-earth metals or else of zirconium (U.S. Pat. No. 4,587,231 or U.S. Pat. No. 4,791,091 or FR-A-2568143) can provide such improvements. In general, these agents are introduced either in the form of pigments in the coating suspension or by impregnating precursor salts on the refractory oxide before being put into suspension, or by impregnating the coated monolith.

SUMMARY OF THE INVENTION

A new technique has now been discovered for introducing such oxides, particularly iron and cerium oxides, into the catalyst, while enhancing their beneficial effects on activity. In general, this technique comprises thoroughly mixing the refractory inorganic oxide with a solution of precursor salts of cerium and iron oxides and, optionally other oxides, and then in atomizing the resultant suspension.

In the preparation of catalytic materials or phases, an atomization step of suspensions has already been disclosed, in order to produce these materials in the form of a powder U.S. Pat. No. 2,915,365 discloses the preparation of an alumina powder from a suspension of a Bayer hydrate; and U.S. Pat. No. 4,552,861 cites the preparation of a catalyst in which a step involves drying and calcining, by spray-calcination, a suspension of a solid catalytic phase obtained by co-precipitation.

An advantage of the process according to the invention is that it renders possible the preparation of a powder that simultaneously contains (1) cerium and iron oxides having a crystallite size determined after calcination, smaller than 5 Å which are tightly bonded to the refractory inorganic oxide and (2) cerium and iron oxides that have little or no interaction with the refractory inorganic oxide and which have larger crystallite sizes (on the order of about 100 angstroms).

The invention also provides a comprehensive process for producing a catalyst of several components containing (1) at least one refractory inorganic oxide, (2) at least one iron oxide, (3) at least one cerium oxide, (4) at least one metal A and, optionally, (5) at least one compound of metal B, said components being deposited in the form of a porous layer ("washcoat") on a ceramic or metal substrate, said process comprising:

a step (a) in which, in an atomizing device, there is atomized an aqueous suspension of at least one powder of said refractory inorganic oxide containing at least one soluble cerium salt, at least one soluble iron salt, optionally at least one portion of at least one insoluble compound and/or at least one soluble salt of said metal B, optionally at least one portion of at least one metal A previously deposited by impregnation of at least one of its precursors on at least one of the solid constituents that are present, said atomizing resulting in a powder which is recovered and optionally calcined;

a step (b) in which said powder is put back into suspension by adding any remainder or all of said compound of metal B, as well as, optionally, at least one bonding agent and, optionally, at least one mineral acid or organic acid;

a step (c) in which a ceramic or metal substrate is coated with the suspension obtained in step (b);

a step (d) in which said coated substrate is calcined;

a step (e) in which said coated and calcined substrate is impregnated with any remainder or all of said precursor of metal A; and a step (f) in which said coated, calcined, and impregnated substrate resulting from step (e) is heat-activated.

The invention more particularly defined is directed to step (a): atomizing an aqueous suspension containing at least one mixture of a powder of a refractory inorganic oxide with a solution of at least one cerium oxide precursor salt and at least one iron oxide precursor salt and, optionally, other compounds, soluble or insoluble, that are part of a composition suitable to form a porous layer (called "washcoat") having a large surface area, to be deposited on the substrate or that is part of the catalytically active phase.

The powder that is recovered after atomization is put back into suspension, optionally with other materials, which suspension is then used to coat the ceramic or metal substrates. The resultant coated substrate is then subjected to calcination to form on the surface of the substrate a thin porous layer (several tens of microns thick) having a large specific surface area (more than 100 m$^2$/g). On this porous layer is deposited the catalytically active phase, consisting essentially of at least one metal that is designated A and preferably selected from among the precious metals such as platinum, palladium, rhodium, iridium, ruthenium, gold, and silver and/or non-precious metals such as rhenium, copper, nickel, cobalt, chromium, manganese, and molybdenum, or a mixture of several of these metals.

More specifically, step (a) of the process of the invention can be broken down into several successive operations, i.e.:

a step (i) in which a mass of solid constituents that comprise said refractory inorganic oxide and, optionally, said insoluble compound of metal B is ground dry or wet, so as to obtain a powder of reduced particle size;

a step (ii) in which an aqueous suspension of said ground solid constituents is prepared with the addition of at least one soluble iron salt and at least one soluble cerium salt, optionally with at least one insoluble or soluble compound of metal B, optionally with at least one metal A that is preimpregnated on at least one of said ground solid constituents and, optionally with at least one mineral acid or inorganic acid;

a step (iii) in which the suspension thus formed is allowed to cure;

a step (iv) in which said suspension is atomized in an atomization device and a powder is recovered; and, optionally, a step (v) in which the powder thus recovered is calcined.

The substrates used in the process of the invention may be ceramic substrates with a beehive structure, metal substrates with a stacked or coiled structure, cloths or foams consisting of silicon fibers or other refractory inorganic materials, or monoliths that are made up of the interlocking or weaving of metal fibers. In the case of metal substrates and for conditions of special applications (for example, automotive post-combustion), stainless steels such as FECRALLOY® composed of iron, chromium, and aluminum, optionally doped with cerium, yttrium, or niobium, or aluminized steels (steel that is coated with a micron film of aluminum) can be subjected to a specific treatment (generally an oxidizing treatment to develop a thin protective layer of aluminum on the surface) to keep the steels from corroding under conditions of use.

The refractory inorganic oxide used according to the invention can be an aluminum oxide of the alpha, gamma, delta, eta, kappa, chi, rho, or theta type, a silica, a silica-alumina, a zeolite, a silica-magnesia, a titanium or zirconium oxide, or a mixture of several of these compounds.

The soluble salts of cerium or of iron that are part of the composition of the suspension to be atomized include but are not limited to halogenides, oxalates, sulfates, acetates or, preferably, nitrates.

The contents by weight, expressed in percent by weight of the oxides $CeO_2$ and $Fe_2O_3$, on the basis of all the dry material that would be obtained after the atomized suspension is dried and calcined at 1000° C., are between, respectively, 0.1 and 10% for cerium oxide and between 0.1% and 10% for iron oxide. These values are preferably between 0.2 and 15% and between 0.15% and 5% and most preferably between 0.5 and 6% for cerium oxide and 0.2 and 2% for iron oxide.

When the catalysts prepared by the process of the invention are used for converting and eliminating pollutants present in the exhaust gases of internal combustion engines, the principal catalytically active phase consists of at least one element A selected from Groups VIB, VIIB, VIII, and IB of the Periodic System and, more specifically: platinum, rhodium, palladium, iridium, ruthenium, gold, and silver, as well as rhenium, copper, cobalt, chromium, molybdenum, and manganese, or a mixture of several of these metals.

Some or all of the active phase A can have been already introduced into the suspension to be atomized but, in this case, this A phase will have been previously impregnated on the refractory oxide or on any other solid constituent of the suspension to be atomized. In general, however, this active phase is introduced by impregnating the coated substrate (covered with the porous layer) with a solution of a precursor of metal A.

To impart good thermal stability or good poison resistance to the catalyst, oxides or other compounds of metal B belonging to groups IA or IIA, to the rare-earths group (atomic numbers 57 to 71, inclusive), or to group IVB of the Periodic System may optionally be added in proportions going from 0 to 10% and preferably between 0 and 5% by weight (the weight ratio between the amount of metal B, expressed as weight of oxide, and the amount of dry material obtained after the atomized suspension is calcined at 1000° C.). Metal B that can be present in the porous layer may be, for example, rubidium, cesium, magnesium, calcium, strontium, or barium, titanium, or zirconium, as well as lanthanum, praseodymium, or neodymium.

This aqueous suspension can also be acidified with at least one mineral acid or organic acid, for example, nitric acid, acetic acid, sulfuric acid, or citric acid. The amount added relative to the weight of the suspension is generally between 0 and 5% by weight, and preferably between 0.5 and 3% by weight.

The grain size of the refractory oxide and, optionally, of the insoluble compound (for example, oxide) of metal B is generally between 0.1 and 100 microns, and preferably between 1 and 20 microns. To adjust this grain size, it is possible to wet-grind either the powder alone, or the suspension before it is atomized.

The potential dry-material content of the suspension to be atomized, expressed as the ratio of the weight of the dry product obtained after calcination at 1000° C. and the weight of the initial suspension, is generally between 5 and 60, and preferably between 10 and 50% by weight. In particular, the suspension before atomization has a solids concentration of 25–50% by weight, and especially 35–45% by weight.

Since a fraction of the precursor salts of cerium and iron oxides, and also of the compound of metal B, can, if soluble, bond tightly to the non-soluble compounds of the suspension, an agitation and curing period may be provided for this purpose. This period of contact (curing time) between the solid and the soluble salts is between, for example, 0.5 and 100 hours, and preferably between 2 and 50 hours. The temperature of this curing step can be between 0 and 50° C., and preferably between 10 and 40° C.

The suspension that is obtained is then atomized in conventional apparatus, generally by injecting the suspension through a nozzle that is supplied with a stream of hot gas circulating at high speed. This operation causes the water in the suspension to be quickly evaporated, with a contact time between the product to be atomized and the hot gas (or a retention time in the dryer) that is very short. The powder resulting from this operation is a free flowing powder having a variable moisture rate, it is then separated from the hot gas by a cyclone system. Depending on the content of dry material in the suspension, the ratio between the flowrates of suspension and of hot gas and, as a function of the intake temperature of this hot gas, the drying and/or calcination of the powder will be more or less accelerated.

In order to achieve the atomization step (a) of the process according to the invention, every conventional apparatus can be used. Examples are the apparatuses described in U.S. Pat. No. 2,915,365 and U.S. Pat. No. 4,552,861. Specific details of apparatus for atomizing are given in Examples 1 and 9, presented below.

According to the process of the invention, the maximum temperature, at the intake of the atomizer, of the hot gas that will make it possible to evaporate the water from the suspension, dry and, optionally calcine the resultant powder, is generally between 100 and 900° C., and preferably between 150 and 800° C., and most preferably between 200 and 700° C. The temperature of the gas exiting from the cyclone after drying is generally between 100 and 600° C., and preferably between 150 and 500° C. The ratio between the flow rate of the hot gas and the flow-rate of the suspension will vary as a function of the flow thermal energy of the hot gas and other factors such as the concentration of the water in the suspension, for example. The residence time of the gas-suspension-powder mixture depends on the parameters mentioned above, as well as on the volume of the drying zone of the atomizer.

In the case where the outlet temperature from the atomizer would not be high enough to decompose the precursor salts of cerium or iron oxide and optionally of the compound of metal B, the resultant powder obtained from the atomization step can be calcined at a temperature of between 150 and 900° C., and preferably between 300 and 700° C. In any case, the powder obtained is a free flowing powder.

To be able to deposit on the above-specified ceramic or metal substrates a porous layer of a sufficiently large specific surface area that is required to ensure good dispersion of catalytic phase A, the powder that is prepared by atomization is put back into an aqueous suspension optionally with a supplement of a precursor of the compound of metal B, optionally an organic or mineral bonding agent such as, for example, nitric acid, acetic acid, or formic acid. The contents of compounds of metal B will be between 0 and 10% by weight, and preferably between 0 and 5% by weight with respect to the amount of dry material.

The addition of a mineral bonding agent (such as an alumina of the boehmite or pseudo-boehmite type) or organic bonding agent (such as gum arabics, cellulose or acrylic compounds) generally makes it possible to improve the adherence of the porous "wash coat" layer to the metal or ceramic substrates. It is added to the suspensions with contents by weight that vary between 0 and 10% by weight and preferably between 0.1 and 5% with respect to the weight of the coating suspension.

The addition of an organic acid (for example, formic or acetic acid) or mineral acid (for example, nitric acid) generally makes it possible to make the suspension more fluid. The concentration of acid by weight, expressed with respect to the suspension weight, is generally between 0 and 5%, and preferably between 0.1 and 2%.

The substrate is then put into contact with the suspension. The excess suspension can, for example, be eliminated by draining and then blowing. The coated substrate is generally dried and then calcined to attach the porous layer with the large specific surface area to this substrate. This step of coating-calcination can be repeated several times to deposit a sufficient amount of material.

In the case where metal substrates (fibers or strips) that contain aluminum (of the FECRALLOY® or aluminized type) are used, a pretreatment in an oxidizing atmosphere, which is intended to produce a protective alumina microlayer on the metal surface, is generally performed at between 700 and 1100° C., and preferably between 750 and 1000° C.

The temperature at which the coated substrate is calcined is between 100 and 800° C., and preferably between 200 and 700° C.

The weight of the "washcoat" (porous layer) that is deposited on the substrates is generally between 20 and 200 g per liter of substrate, and preferably between 50 and 150 g per liter.

If not all of the catalytically active phase is introduced during the preceding phases, impregnation of the coated monolith is performed one or more times with solutions containing precursor compounds of the metals. A final heat treatment intended to activate the catalysts, is generally carried out under an inert atmosphere (nitrogen), a reducing atmosphere (dilute hydrogen or a CO-containing gas from the incomplete combustion of a liquid or gaseous fuel), or an oxidizing atmosphere (air or air diluted in nitrogen).

The content of catalytically active phase (metal A), generally consisting of precious metals such as platinum, palladium, rhodium, ruthenium, iridium, gold, and silver, and, optionally, transition metals such as rhenium, copper, cobalt, nickel, chromium, molybdenum, manganese, or a mixture of several of these metals, is generally between 0.05 and 10 g per liter of substrate, preferably between 0.1 and 5 g per liter, and most preferably between 0.5 and 2 g per liter of substrate.

The final heat treatment is generally carried out at a temperature between 200 and 900° C., and preferably between 300 and 700° C.

Without further elaboration, it is believed that one skilled in the art can, using the preceding description, utilize the present invention to its fullest extent. The following preferred specific embodiments are, therefore, to be construed as merely illustrative and not limitative of the remainder of the disclosure in any way whatsoever.

In the foregoing and in the following examples, all temperatures are set forth uncorrected in degrees Celsius; and, unless otherwise indicated, all parts and percentages are by weight.

The entire disclosures of all applications, patents, and publications cited herein and of corresponding French Application 93/05947, filed May 14, 1993, are hereby incorporated by reference.

EXAMPLES

Examples 2 to 5 and Example 7 describe the preparation of catalysts according to the prior art. They are tested by way of comparison in Examples 16 and 17.

Example 1

Into 3900 ml of deionized water are poured the equivalent of 126 g of cerium oxide ($CeO_2$) in the form of crystallized cerium nitrate ($Ce(NO_3)_3$, $6H_2O$) and the equivalent of 42 g of iron oxide ($Fe_2O_3$) in the form of iron nitrate ($Fe(NO_3)_2$, $9H_2O$). After these salts are dissolved, the equivalent of 1932 g of gamma-type alumina is introduced into the solution in powder form.

This suspension, which is agitated at ambient temperature for 2 hours and wet-ground so that the average diameter of the particles is equal to about 8 microns, is then atomized by injection into a system that makes it possible to disperse it in a stream of hot air at 250° C., with the temperature of the mixture of moist air-powder at the atomizer outlet being 150° C.

The atomization step is operated in a BÜCHI® atomizer. The suspension is injected through micro-openings and sprayed in the form of a mist. The suspension is diluted by the concentric inlet of a strong air stream, previously heated by electrical resistances. The air-suspension mixture is circulated tangentially to the wall of the desiccation chamber, in which the solid particles are being depleted in water and the air is being enriched in moisture. At the outlet of this chamber, the powder obtained is not absolutely dry, but is free flowing.

The mixture moist air-powder is circulated in a cyclone adjoining the desiccation chamber. The operating conditions, particularly the temperature of the hot air, serve to regulate the outlet temperature of the moist iar. By drying and calcination of the particles, any residual water is being removed, and the decomposition of the presucror salts to oxides is being completed.

After calcination at 550° C. for 2 hours, 1750 g of this powder is mixed with 300 g of binding alumina (pseudo-boehmite) having an average particle size of less than 6 microns, and is then put back into an aqueous suspension in the presence of 41 g of nitric acid so that the content of dry material of this new suspension is equal to 35% by weight.

A cylindrical ceramic monolith of cordierite (118.4 mm in diameter and 76.2 mm length) with 62 cells per $cm^2$ is immersed in this suspension, shaken, and then the excess suspension is blown out. The resultant monolith is calcined for 2 hours at 600° C. This coating and calcining step is repeated a second time. The weight of the porous layer ("washcoat") that is deposited is 104 g/liter of substrate.

The coated monolith is then impregnated with a quantity of a solution of precious metals corresponding to 1.5 times the pore volume of the "wash coat" and containing the salts of platinum ($H_2PtCl_6$) and of rhodium ($RhCl_3$), in such a way that the content of precious metals on the catalyst is 1.4 g per liter of substrate, with a weight ratio of platinum to rhodium equal to 5. This coated and impregnated monolith is dried for 2 hours at 150° C. and then activated at 500° C. for 2 hours under air.

Example 2 (Comparative)

A powder mixture is prepared that contains the oxides of aluminum, iron, and cerium in quantities equivalent to 2254 g of gamma-type alumina, 147 g of cerium oxide ($CeO_2$), 49 g of iron oxide ($Fe_2O_3$), and the equivalent of 420 g of binding alumina (pseudo-boehmite). This mixture is poured into a receptacle containing water that is acidified with nitric acid such that the dry-material content of the suspension is 35% by weight and the weight ratio of acid to dry material is 2%. This suspension is ground in such a way that the average particle size of the particles is between 6 and 8 microns.

The steps of coating of the suspension and impregnating the precious metals are identical to those of Example 1.

Example 3 (Comparative)

A powder mixture is prepared that contains aluminum oxides in quantities equivalent to 2254 g of gamma-type filler alumina and 420 g of binding alumina of the pseudo-boehmite type. This mixture is poured into a receptacle containing water that is acidified with nitric acid such that the dry-material content of the suspension is 35% by weight and the weight ratio of acid to dry material is 2%. This suspension is ground in such a way that the average particle size of the particles is between 6 and 8 microns.

The step of coating is carried out as in Example 1, with the exception that the "wash coat" content, after calcination at 600° C., is limited to 96.9 g per liter of substrate.

The addition of cerium and iron is done by impregnating the coated monolith with a solution of iron and cerium nitrates containing the equivalent of 5.3 g of cerium oxide ($CeO_2$) and 1.8 g of iron oxide ($Fe_2O_3$).

After being dried and calcined, the monolith is impregnated, as in Example 1, with a hydrochloric solution of chloroplatinic acid and rhodium chloride, in such a way that the content of precious metals is 1.4 g per liter of substrate, with a weight ratio of platinum to rhodium equal to 5. The final heat treatment is identical to that of Example 1.

Example 4 (Comparative)

The equivalent of 2500 g of gamma-type alumina balls is dry-impregnated with 2800 $cm^3$ of an aqueous solution of iron and cerium nitrates containing the equivalent of 54.5 g of iron oxide ($Fe_2O_3$) and 163 g of cerium oxide ($CeO_2$). After being dried and calcined for 4 hours at 600° C., the balls are dry-ground to obtain a powder with an average particle size of less than 30 microns.

A quantity of 1750 g of this powder is mixed with 300 g of alumina equivalent ($Al_2O_3$) of the pseudo-boehmite type, then the entire amount is poured into water acidified with $HNO_3$ in such a way that the dry-material content is 35%. by weight and the weight ratio of acid to dry material is 2%.

After the suspension is wet-ground to reduce the size of the particles to about 6–8 microns, a ceramic monolith is coated with this suspension, then impregnated with precious metals according to the conditions described in Example 1.

Example 5 (Comparative)

A batch of doped alumina is prepared by impregnating 3000 g of gamma alumina balls with 8 liters of an aqueous solution of ferric nitrate, cerium nitrate, and zirconyl nitrate containing the equivalent of 300 g of iron, 700 g of cerium, and 700 g of zirconium. After a contact time of 30 minutes, the balls are dried, calcined at 700° C., then ground so that the average diameter of the particles is 7 microns.

A suspension is prepared from 2700 g of this powder batch, 300 g of binding alumina, and 6 l of water.

After being calcined at 500° C., a 1.2 liter-volume metal substrate coated with this suspension at pH=3.5 is impregnated with a solution containing palladium nitrate and rhodium chloride, in such a way as to deposit on this substrate the equivalent of 3 g of palladium and 0.3 9 of rhodium.

The catalyst thus prepared and calcined at 500° C. contains, by weight with respect to the finished catalyst, the equivalent of 0.2% palladium, 0.02% rhodium, 1.5% iron, 3.5% cerium, and 3.5% zirconium.

Example 6

According to the technique described in Example 1, there is atomized an aqueous suspension containing the equivalent of 3000 g of the same alumina as the one used in Example 5 but ground to an average particle size of 7 microns and a nitric solution that contains, as above, the equivalent of 300 g of iron, 700 g of cerium, and 700 g of zirconium.

A new suspension is prepared from 2700 g of powder resulting from atomization and recalcination at 550° C., 300 g of binding alumina, and 7 l of water, with the pH being adjusted to 3.5.

The conditions for coating and impregnating a metal substrate of 1.2 liters are identical to those described in Example 5.

Example 7 (Comparative)

A ceramic substrate is coated with a gamma alumina suspension that is stabilized with calcium ions, then dried and calcined at 900° C. This monolith, which is coated with 180 g of "wash coat," is then impregnated with a solution of cerium acetate, iron nitrate, and zirconium acetate, then dried and calcined at 700° C.

This coated substrate is then impregnated with a solution of platinum nitrate, rhodium nitrate, and aluminum nitrate in such a way that the amount of precious metals introduced is 2.16 g at a ratio Pt/Rh=5, while that of aluminum is 1.08 g. The content of each of the oxides of iron, cerium, and zirconium is 6.6% with respect to the weight of the alumina coated on the substrate.

Example 8

According to the conditions of Example 1, there is atomized a suspension containing the alumina that was used in Example 7 and a solution of iron nitrate, cerium acetate, and zirconium acetate, in such a way that the content of each of these oxides is 6.6% by weight with respect to the weight of the alumina used.

A ceramic substrate is coated with a suspension that is prepared from the atomized powder, then is impregnated with a solution of salts of platinum, rhodium, and aluminum, according to the same operating conditions and with the same quantities as those used in Example 7.

Example 9

To 3900 g of water is added 1900 g of gamma-type alumina that is previously impregnated with 1% by weight of palladium and the equivalents, in the form of nitrate solutions, of 680 g of cerium oxide ($CeO_2$), 130 g of iron oxide ($Fe_2O_3$), and 50 g of lanthanum oxide ($La_2O_3$). After being wet-ground to reduce the average size of the particles to about 7 microns, this suspension is cured while being agitated for 50 hours at 35° C., then atomized at high temperature ("spray calcination").

The atomization is carried out in an apparatus, similar to that of Example 1, but in which the walls of the desiccation chamber and the cyclone are made of refractory lined metal; hot air is produced by combustion of natural gas, and the combustion gases are diluted with air to meet the desired intake temperature. The intake temperature of the hot gas is approximately 750° C., and the injection flow rate of the suspension is adjusted in such a way that the outlet temperature of the gases is between 400 and 500° C.

A new suspension is prepared by pouring 2000 g of the powder prepared above and 10 g of gum arabic (organic binder) into 4 liters of water acidified with 60 g of acetic acid.

The steps of coating the suspension and of impregnating the ceramic monolith are identical to those of Example 1, with the exception that the contents of platinum and rhodium that are impregnated are, respectively, 0.55% and 0.15% by weight with respect to 100 g of deposited "wash coat."

Example 10

An aqueous suspension (6 l) containing 1900 g of gamma-type alumina that is previously impregnated with the equivalent of 1% by weight of silica, 50 g of barium carbonate, 400 g of cerium oxide ($CeO_2$) (a cerium nitrate solution), and 50 g of iron oxide ($Fe_2O_3$) (a ferric nitrate solution) is cured while being agitated for 5 hours at ambient temperature, then ground to reduce the average size of the particles to about 10 microns.

This suspension is dried by atomization in a stream of hot air having an initial temperature of 350° C., while the temperature at the drying outlet is approximately 250° C.

A new powder mixture containing 2000 g of atomized product and the equivalent of 500 g of pseudo-boehmite type alumina is dispersed in 7 liters of water that is acidified with 100 g of formic acid.

A metal monolith, consisting of a co-coiling of two strips of FECRALLOY® type steel 50 microns thick, the one being flat and the other corrugated, soldered and kept rigid in a steel hoop 1.5 mm thick, is coated with this suspension according to the technique described in Example 1. This operation is repeated three times so that the weight of the porous "wash coat" layer of this monolith having 46 cells per $cm^2$ is 165 g per liter of substrate.

This monolith, coated and calcined at 600° C., is impregnated with a solution of palladium nitrate and rhodium nitrate in such a way that the content of precious metals is 2.1 g per liter of substrate, with a weight ratio of palladium to rhodium of 10.

After being dried and calcined for 2 hours at 500° C., the catalyst is subjected to a reducing treatment by replacing the air with nitrogen and, once all the oxygen has been eliminated, by injecting into this nitrogen the equivalent of 1% volume of hydrogen. This reducing treatment is carried out for 30 minutes at 500° C. before replacing the reducing gas with hydrogen-free nitrogen at ambient temperature and then with air.

Example 11

According to the technique of Example 1, a suspension containing the equivalent of 2500 g of gamma alumina, 600 g of cerium oxide equivalent (nitrate solution), and 20 g of iron oxide equivalent (also nitrate solution) is ground and then cured for 16 hours at 20° C. This suspension is then atomized between 300° C. (gas intake temperature) and 110° C. (outlet temperature), the powder then being recalcined at 500° C. for 4 hours.

A new suspension is prepared by adding the atomized powder containing cerium and iron to the water that is acidified with acetic acid (1% by weight).

A metal substrate with a stacked structure (prepared by superposing corrugated strips of FECRALLOY® type steel) and with straight channels (46 cells/$cm^2$) is coated with this suspension. The monolith, coated, dried, and calcined at 600° C., is then impregnated with a palladium nitrate solution at a ratio of 1.2 g per liter of substrate, then dried and calcined at 500° C.

Example 12

The preparation is identical to that of Example 11, except that, in addition to alumina and solutions of iron nitrate and cerium nitrate, the atomized suspension contains titanium oxide ($TiO_2$) at a weight ratio of $Al_2O_3/TiO_2=5$ and that, in the impregnation of the precious metals, palladium has been replaced with platinum with a content of 0.5 g per liter of substrate.

Example 13

A nitrate solution containing the equivalents of 80 g of cerium oxide, 40 g of iron oxide, 200 g of aluminum oxide, and 50 g of lanthanum oxide is poured into an aqueous suspension containing 1200 g of gamma-type alumina and 600 g of alpha-type alumina.

This ground suspension, cured for 50 hours at ambient temperature, is atomized with air having a temperature at the intake of 850° C. and approximately 500–550° C. at the atomizer outlet.

The powder that is recovered is put back into an aqueous acetic acid suspension (pH=5.1) with a binding alumina (the weight ratio of atomized powder to binding alumina is equal to 85/15), then coated on a metal substrate with a fibrillar structure (interlocking of fibers about 50 microns thick and 0.1–0.2 mm wide) in FECRALLOY® type steel.

The coated monolith (90 g of "wash coat" per liter of substrate), dried and calcined at 600° C., is then impregnated with a solution of platinum dinitrosotetramine in such a way that the content of precious metals is 2.2 g per liter of substrate; and, finally, dried and calcined at 500° C.

Example 14

An aqueous suspension, acidified with 1% by weight of citric acid, is prepared by dissolving iron nitrate and cerium nitrate and adding gamma-type alumina. In terms of dry materials, this solution contains the equivalents of 90% by weight of alumina, 7.5% by weight of cerium oxide, and 2.5% by weight of iron oxide.

After a curing time of 4 hours at ambient temperature and under agitation, this suspension is atomized at a temperature between 600 and 350° C.

The powder that is recovered is remixed with 10% by weight of binding alumina and then put back into suspension with water that is acidified with acetic acid (2% by weight with respect to the dry material).

A metal substrate, consisting of the superposition of strips of aluminized steel (steel covered with a thin layer of aluminum) 50 microns thick and exhibiting a corrugated structure with zigzag channels (non-rectilinear) is coated in three steps to deposit the equivalent of 115 g of "wash coat" per liter of substrate.

After being dried and calcined at 600° C. for 4 hours, the coated monolith is impregnated with a solution of palladium nitrate and of platinum dinitroso-tetramine, in such a way that the content of precious metals is 1.1 g per liter with a weight ratio of palladium to platinum of 2. The final heat treatment is carried out, as in Example 6, in a reducing environment.

Example 15

The catalyst prepared in Example 9 is reproduced, with the exception that the gamma-type alumina is preimpregnated with the equivalent of 0.5% by weight of gold and 1% by weight of molybdenum instead of 1% by weight of palladium, and that the addition of lanthanum oxide to the suspension that is to be atomized is eliminated.

The operating conditions of the steps of atomization, coating, and impregnation of the precious metals are also identical to those described in Example 9.

Example 16

Each of the six catalysts that are prepared as described in Examples 1 to 6 is placed on an engine bench equipped with a 2-liter engine whose supply of fuel is assured by a multipoint injection controlled by a richness regulation probe (lambda probe). The catalysts are installed on the exhaust line, provided with a heat exchanger that makes it possible to regulate the exhaust-gas temperature from 150 to 600° C. Previously, the catalyst is conditioned to richness 1 for 10 hours at 700° C.

The catalytic tests are carried out under conditions of constant motion, operating at an average richness of 1, an average deviation in richness amplitude of ±0.05, and with a pulsation frequency of 1 hertz. The temperature of the gases at the intake of the catalyst is increased in increments of 10° C., between 250 and 550° C.

Analysis of the gases at the intake and outlet of the catalyst is performed continuously: by infrared means for carbon monoxide, by chemiluminescence for nitrogen oxides, and by flame ionization for hydrocarbons.

The effectiveness of the catalyst for a pollutant is measured by the ratio between the integral of the curve representing the conversion of this pollutant as a function of temperature between 300 and 550° C. and the integral that would result from a total conversion in the given temperature range. This effectiveness is expressed in percent.

The effectiveness values for each of the main pollutants of an exhaust gas are summarized in Table 1 below for the catalysts that are prepared according to the operating conditions described in Examples 1 to 6.

TABLE 1

| Example | Composition of the "wash coat" (% by weight) | | | | Metals (g/l) | Effectiveness (%) | | |
|---|---|---|---|---|---|---|---|---|
| | $Al_2O_3$ | $CeO_2$ | $Fe_2O_3$ | $ZrO_2$ | | CO | $NO_x$ | HC |
| | | | | | Pt/Rh = 5 | | | |
| 1 | 93.17 | 5.12 | 1.71 | | 1.4 | 80 | 71 | 76 |
| 2* | 93.17 | 5.12 | 1.71 | | 1.4 | 71 | 64 | 74 |
| 3* | 93.12 | 5.12 | 1.71 | | 1.4 | 74 | 68 | 73 |
| 4* | 93.17 | 5.12 | 1.71 | | 1.4 | 76 | 69 | 71 |
| | | | | | Pt/Rh = 10 | | | |
| 5* | 61.58 | 14.74 | 7.38 | 16.3 | 1.5 | 80 | 62 | 73 |
| 6 | 61.58 | 14.74 | 7.38 | 16.3 | 1.5 | 85 | 63 | 81 |

* = (comparative)

The catalysts that are prepared according to the invention and described in Examples (1) and (6) exhibit levels of performance, expressed here in terms of their efficiency, that are superior by several percentages to those of the catalysts of Examples (2), (3), and (4), on the one hand, and (5), on the other, which are prepared according to the prior art.

Example 17

On an engine bench equipped with a carburetor, the catalysts of Examples 7 to 10 are subjected to accelerated aging in an oxidizing environment for a period of 200 hours, thus approximately simulating the actual aging of catalysts which would have been equipped on a vehicle having travelled 80,000 kilometers. The average richness (R) of the air-fuel mixture is on the order of R=0.95, and the aging cycle corresponds to the operating condition of a vehicle travelling at 150 km/hr for 1 minute and then abruptly slowing to 50 km/hr with a 20-second injection of air for this condition. The maximum temperatures that are reached are on the order of 900° C.

The catalysts are then tested under the operating conditions described in Example 16. The compositions of the catalysts by weight and their levels of effectiveness with respect to the main pollutants are given in Table 2 below.

TABLE 2

| Example | *Composition of the catalysts (% by weight) | | | | | | Metals (g/l) | Effectiveness (%) | | |
|---|---|---|---|---|---|---|---|---|---|---|
| | $CeO_2$ | $Fe_2O$ | $ZrO_2$ | $SiO_2$ | $La_2O$ | BaO | | CO | $NO_x$ | HC |
| | | | | | | | Pt/Rh = 5 | | | |
| 7** | 5.51 | 5.51 | 5.51 | | | | 2.16 | 71 | 55 | 68 |
| 8 | 5.51 | 5.51 | 5.51 | | | | 2.16 | 75 | 61 | 72 |
| | | | | | | | Pt/Rh = 3.6 | | | |
| 9 | 24.6 | 4.71 | | | 1.81 | | Pt + Rh/Pd 1.4 Pd/Rh = 10 | 66 | 51 | 64 |
| 10 | 13.3 | 1.67 | | 0.64 | | 1.3 | 2.1 | 73 | 46 | 74 |

*The alumina content corresponds to the difference at 100%
** = (comparison)

The effectiveness of the catalyst of Example (8), which was prepared according to the invention and tested after rigorous aging for 200 hours, is superior to that of the catalyst of Example (7), which was prepared according to the prior art.

The results for the catalysts of Examples (9) and (10) illustrate the invention but cannot be compared to the previous ones since their formulation is different.

Example 18

The catalysts prepared as described in Examples 11 and 12 were laboratory-tested with gaseous mixtures representative of a composition of exhaust gases from an engine with a lean mixture, on the one hand, and from a small-cylinder-volume diesel engine, on the other. Twenty ppm of sulfur dioxide was added to the gaseous mixtures, whose volumetric composition is defined in Table 3.

The catalytic activity is characterized by determining the value of the starting temperature of the oxidation reaction ("light-off" temperature LOT), i.e., the temperature for which 50% of a pollutant is converted. In Table 4 the starting temperature of nitrogen oxide is not mentioned because their conversion rate is virtually zero.

TABLE 3

| | Compositions of the gaseous mixtures (ppm or % volume) | | | | | |
|---|---|---|---|---|---|---|
| Example | CO | $NO_x$ | $C_3H_8$ | $O_2$ | $H_2O$ | $CO_2$ |
| 11 | 1500 | 500 | 300 | 7% | 10% | 11% |
| 12 | 250 | 400 | 100 | 10% | 7% | 8% |

TABLE 4

| | Compositions of catalysts (% by weight) | | | | Metals | Light-off temperature (° C.) | |
|---|---|---|---|---|---|---|---|
| Example | $Al_2O_3$ | $CeO_2$ | $Fe_2O_3$ | $TiO_2$ | (g/l) | CO | HC |
| | | | | | Pd | | |
| 11 | 80.13 | 19.23 | 0.64 | | 1.2 | 185 | 218 |

TABLE 4-continued

| | Compositions of catalysts (% by weight) | | | | Metals | Light-off temperature (° C.) | |
|---|---|---|---|---|---|---|---|
| Example | $Al_2O_3$ | $CeO_2$ | $Fe_2O_3$ | $TiO_2$ | (g/l) | CO | HC |
| | | | | | Pt | | |
| 12 | 68.69 | 16.48 | 0.55 | 14.28 | 0.5 | 204 | 210 |

Example 19

The catalysts prepared as described in Examples 13 and 14 were tested in catalytic mini-tests with gas compositions that simulate the emissions of two types of two-stroke engines, the compositions of which by volume are presented in Table 5. Before being tested, these catalysts were artificially aged by being heat-treated at 950° C. for 16 hours under nitrogen to which 1% oxygen and 10% water were added.

As in Example 16, the measuring of activity was done by calculating the effectiveness levels of the catalyst for carbon monoxide and for hydrocarbons between 200 and 500° C., effectiveness levels whose values are presented in Table 6.

TABLE 5

| | Compositions of the gaseous mixtures (% volume) | | | | | |
|---|---|---|---|---|---|---|
| Example | CO | $C_3H_8$ | $NO_x$ | $O_2$ | $CO_2$ | $H_2O$ |
| 13 | 0.5 | 0.5 | 0.1 | 2 | 6 | 6 |
| 14 | 0.2 | 0.1 | 0.15 | 6 | 8 | 8 |

TABLE 6

| | Composition of "wash coat" (% by weight) | | | | Metals | Effectiveness (%) | |
|---|---|---|---|---|---|---|---|
| Example | $Al_2O_3$ | $CeO_2$ | $Fe_2O_3$ | $La_2O_3$ | (g/l) | CO | HC |
| | | | | | Pt | | |
| 13 | 93.34 | 3.14 | 1.56 | 1.96 | 2.2 | 70 | 63 |

TABLE 6-continued

| | Composition of "wash coat" (% by weight) | | | | Metals | Effectiveness (%) | |
|---------|------|------|------|------|--------|----|----|
| Example | Al$_2$O$_3$ | CeO$_2$ | Fe$_2$O$_3$ | La$_2$O$_3$ | (g/l) | CO | HC |
| | | | | | Pt/Pd = 2 | | |
| 14 | 91 | 6.75 | 2.25 | | 1.1 | 74 | 71 |

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A process for producing a catalyst that contains at least one refractory inorganic oxide, which is α-alumina, γ-alumina, Δ-alumina, eta-alumina, theta-alumina, kappa-alumina, rho-alumina, chi-alumina, silica, a silica-alumina, a zeolite, a silica-magnesia, titanium oxide, zirconium oxide, or a mixture thereof; at least one iron oxide; at least one cerium oxide; at least one catalytically active metal A from Group VIB, VIIB, VIII or IB of the Periodic System; and optionally at least one compound of metal B from Group IA, IIA, IVB, or rare earths having atomic numbers 57–71 inclusive, all deposited in the form of a porous layer on a ceramic or metal substrate, said process comprising:

(a), in an atomizing device having an inlet and an outlet, atomizing an aqueous suspension of at least one powder of said refractory inorganic oxide, at least one soluble cerium salt, at least one soluble iron salt, optionally at least one portion of at least one insoluble compound and/or at least one soluble salt of said metal B, and optionally at least one portion of at least one metal A that has been previously deposited by impregnation of at least one of a precursor thereof on at least one of the solid constituents that are present, so as to recover a powder, and optionally calcining the resultant powder;

(b) transferring the resultant powder from step (a) back into suspension while optionally adding said compound of metal B, as well as, optionally at least one bonding agent and optionally at least one mineral acid or organic acid;

(c) coating a ceramic or metal substrate with the suspension obtained in step (b);

(d) calcining the coated substrate from step (c);

(e) impregnating said coated and calcined substrate with any remainder or all of said precursor of metal A; and (f) heat-activating said coated, calcined, and impregnated substrate obtained from (e).

2. A process according to claim 1, wherein step (a) includes:

(i) grinding dry or wet said refractory inorganic oxide and, optionally said insoluble compound of metal B, in such a way as to obtain a powder of reduced average particle size;

(ii) preparing an aqueous suspension of said ground solid constituents with the addition of at least one soluble iron salt and at least one soluble cerium salt, optionally at least one insoluble or soluble compound of metal B, optionally at least one metal A that is preimpregnated on at least one of said ground solid constituents and, optionally, at least one mineral acid or inorganic acid;

(iii) allowing the suspension thus formed is allowed to cure;

(iv) atomizing said suspension in an atomization device and recovering a powder; and optionally (v) calcining the powder thus recovered.

3. A process according to claim 2, wherein the average particle size of the powder recovered from (a)(i) is between 0.1 and 100 microns.

4. A process according to claim 2, wherein the suspension to be atomized has a potential dry-material content between 5 and 60% by weight.

5. A process according to claim 2, wherein in (a) (iii) the curing time of the suspension to be atomized is between 0.5 and 100 hours.

6. A process according to claim 5, wherein in (a) (iii) the curing temperature is between 0 and 50° C.

7. A process according to claim 1, wherein the cerium oxide content of the powder recovered after atomization is between 0.1 and 40% determined after calcination at 1000° C.

8. A process according to claim 1, wherein the iron oxide content of the powder recovered after atomization is between 0.1 and 10% determined after calcination at 1000° C.

9. A process according to claim 1, wherein metal B is present and is rubidium, calcium, strontium, barium, lanthanum, praseodymium, neodymium, zirconium or titanium.

10. A process according to claim 1, wherein metal B is present and the content of the compound of metal B of the powder recovered after atomization is between 0 and 10%, determined after calcination at 1000° C.

11. A process according to claim 1, wherein metal A is platinum, rhodium, palladium, iridium, ruthenium, rhenium, gold, silver, copper, nickel, cobalt, manganese, chromium, molybdenum or mixtures thereof.

12. A process according to claim 2, wherein the amount of mineral acid added to the aqueous suspension in (a) (ii) is between 0 and 5% by weight of the suspension.

13. A process according to claim 1, wherein in (a) hot gas at a temperature of 100 to 900° C. is fed to the intake of the atomizing device.

14. A process according to claim 13, wherein in (a) the temperature of the gas measured at the outlet of the atomizing device is between 100° C. and 600° C.

15. A process according to claim 1, wherein the powder from atomizing is calcined at a temperature between 150 and 900° C., and preferably between 300 and 700° C.

16. A process according to claim 1, wherein said metal substrate is an aluminized steel.

17. A process according to claim 1, wherein said metal substrate is treated, before coating in (c), under an oxidizing atmosphere between 700 and 1100° C.

18. A process according to claim 1, wherein the quantity of binder added to the aqueous suspension in (b) represents 0 to 10% by weight of said suspension.

19. A process according to claim 1, wherein the quantity of mineral or organic acid added to the aqueous suspension in (b) represents 0 to 5% by weight of said suspension.

20. A process according to claim 1, wherein in (c) the substrate is coated with said suspension, then excess suspension present in channels of the substrate is eliminated, and the substrate coated in (d) is calcined at a temperature of between 100 and 800° C.

21. A process according to claim 1, wherein the weight of the porous layer deposited is between 20 and 200 g per liter of substrate.

22. A process according to claim 1, wherein in (e) the coated substrate is impregnated with the remainder or all of the precursors of metal A, with a total content of between 0.05 and 10 g per liter of substrate.

23. A process according to claim 1, wherein in (f) the heat treatment is conducted in an inert, oxidizing, or reducing atmosphere and is carried out at a temperature of between 200 and 900° C.

24. A catalyst produced according to the process of claim 1.

25. In the catalytic conversion and/or elimination of pollutants present in the exhaust gases of internal combustion engines, the improvement comprising passing said gases in contact with a catalyst according to claim 24.

26. In a process for producing a catalyst containing a ceramic or metal substrate having deposited thereon a porous layer of at least one refractory inorganic oxide, which is α-alumina, γ-alumina, Δ-alumina, eta-alumina, theta-alumina, kappa-alumina, rho-alumina, chi-alumina, silica, a silica-alumina, a zeolite, a silica-magnesia, titanium oxide, zirconium oxide, or a mixture thereof; at least one iron oxide; and at least one cerium oxide; at least one metal A and, optionally, at least one compound of metal B; said process comprising forming a powder and applying said powder to said substrate, the improvement in forming said powder which comprises atomizing an aqueous suspension of at least one powder of said refractory inorganic oxide, at least one soluble cerium salt, at least one soluble iron salt, optionally at least one portion of at least one insoluble compound and/or at least one soluble salt of said metal B, and optionally at least one portion of at least one metal A that was previously deposited by impregnation of at least one precursors thereof on at least one of the solid constituents that are present so as to recover a powder.

27. A catalyst as produced by the process of claim 26.

28. A process according to claim 26, further comprising resuspending the atomized free flowing powder to form a coating suspension.

* * * * *